United States Patent [19]
Copeland

[11] Patent Number: 6,067,319
[45] Date of Patent: May 23, 2000

[54] METHOD FOR EQUALIZATION OF A QUADRATURE AMPLITUDE MODULATED SIGNAL

[75] Inventor: Gregory Clark Copeland, San Jose, Calif.

[73] Assignee: Integrated Device Technology, Inc., Santa Clara, Calif.

[21] Appl. No.: 08/922,878

[22] Filed: Sep. 3, 1997

Related U.S. Application Data

[60] Provisional application No. 60/025,065, Sep. 4, 1996.

[51] Int. Cl.[7] .................. H03H 7/30; H03H 7/40
[52] U.S. Cl. ............ 375/232; 370/350; 375/348; 375/233
[58] Field of Search .................... 375/232, 354, 375/344, 341, 222; 348/607; 370/350

[56] References Cited

U.S. PATENT DOCUMENTS

| | | | |
|---|---|---|---|
| 5,263,026 | 11/1993 | Parr et al. | 370/350 |
| 5,285,480 | 2/1994 | Chennakeshu et al. | 375/348 |
| 5,400,368 | 3/1995 | Cheng et al. | 375/354 |
| 5,436,942 | 7/1995 | Cheng et al. | 375/229 |
| 5,453,797 | 9/1995 | Nicolas et al. | 348/607 |
| 5,471,501 | 11/1995 | Parr et al. | 375/354 |
| 5,513,216 | 4/1996 | Gadot et al. | 375/233 |
| 5,513,221 | 4/1996 | Parr et al. | 375/344 |
| 5,524,125 | 6/1996 | Tsujimoto | 375/347 |
| 5,528,625 | 6/1996 | Ayanglo et al. | 375/222 |
| 5,537,419 | 7/1996 | Parr et al. | 375/350 |
| 5,541,956 | 7/1996 | Ueda | 375/232 |
| 5,546,430 | 8/1996 | Liao et al. | 375/341 |

*Primary Examiner*—Stephen Chin
*Assistant Examiner*—Thomas E. McKiernan

[57] ABSTRACT

A method and apparatus for equalizing a received quadrature amplitude modulated signal is disclosed. To equalize the signal, a band edge equalizer (BEE) is used in combination with a symbol spaced equalizer (SSE) and possibly a decision feedback equalizer (DFE). The equalizer's are used along a series path to equalize the QAM signal in a series of equalization operations. By separating the equalization of the signal to separate equalizers, the cost of the equalization can be reduced without substantially affecting performance. In particular, band edge equalizing the QAM signal and symbol space equalizing the symbol can reduce the number of multiplies per second required by any particular equalizer. Accordingly, the equalizers used can be less expensive. Also, using a decimating circuit between the BEE and the SSE that decimates the sample rate of the signal being provided to the SSE can further reduce the number of multiplies per second that must be performed by the SSE. Clock recovery and synchronization circuits have also been disclosed.

31 Claims, 12 Drawing Sheets

Spectrum of Ideal QAM Signal

First Spectrum of Distorted QAM Signal

Second Spectrum of Distorted QAM Signal

Frequency Response of Band-Edge Equalizer

Shifted Spectral Replicas From First Reduced Fs

Shifted Spectral Replicas From Second Reduced Fs

First Aliasing Spectrum

Second Aliasing Spectrum

METHOD FOR EQUALIZATION OF A QUADRATURE AMPLITUDE MODULATED SIGNAL

This application claims the benefit of U.S. Provisional application Ser. No. 60/025,065, filed on Sep. 4, 1996 entitled QAM Demodulator and Clock Recovery system, having inventor Greg Copeland. U.S. Provisional application Ser. No. 60/025,065 is hereby incorporated herein by this reference.

BACKGROUND OF THE INVENTION

1. Field of the Invention

The field of the invention relates generally to the equalization of communication signals, and more particularly to the equalization of digital quadrature amplitude modulated signals.

2. Background

Quadrature Amplitude Modulation (QAM) systems transmit information from a transmitter to a receiver using quadrature amplitude modulated (QAM) signals. QAM signals include "symbols" where each symbol typically represents a plurality of data bits. To form the symbols, two carrier signals that have a quadrature phase relationship to each other are amplitude modulated by the transmitter. After amplitude modulation, the transmitter typically combines the two modulated carrier signals. The resulting QAM signal is then modulated with a communications carrier and transmitted over a transmission channel to provide to the receiver a received signal that includes received symbols. The receiver processes the received signal to obtain the information that it contains. Quadrature amplitude modulated signal as used herein shall refer to signals that have been quadrature amplitude modulated even when the signal has been subsequently processed. Thus, quadrature amplitude modulated signal shall refer to the signal prior to modulation with the communications carrier, the signal transmitted by the transmitter that has been modulated with the communications carrier, the signal received by the receiver prior to any processing, and to the signal that has been digitized, demodulated, equalized and/or gone through detection, for example.

The transmission channel over which the QAM signal is transmitted ideally provides to the receiver a received QAM signal and received QAM symbols that are identical to the transmitted signal and the transmitted symbols. Unfortunately, transmission channels are rarely, if ever, ideal. A variety of noise disturbances and other interference associated with the transmission channel can affect the signal. For example, the transmission channel typically will have a non-ideal frequency response and will have a limited bandwidth, possibly introducing both amplitude and delay distortion. Intersymbol Interference (ISI) often occurs. Transmission at a symbol frequency Fb (also called symbol rate) that is more than twice the bandwidth of the channel typically causes intersymbol interference. ISI can also occur when there are a number of propagation paths between the transmitter and the receiver each having different time delays associated with them. When the difference between the longest time delay of a propagation path and the shortest time delay of another propagation path becomes comparable to a symbol period, intersymbol interference results.

For years communications engineers have been seeking new techniques and analyzing old techniques to reduce or eliminate the effects of intersymbol interference introduced by transmission channels. Filters called equalizers have been used in an effort to achieve this result. Unfortunately, conventional equalization techniques used to combat ISI can be relatively expensive and can add complexity to the system, particularly in high performance or high rate systems. High rate systems, for example, may require expensive equalizers that are capable of handling a large number of multiplications per second.

Accordingly, there has been a need for a method and apparatus that appropriately equalizes a noisy or otherwise distorted QAM signal without the expense and complexity sometimes associated with conventional equalization systems.

SUMMARY OF THE INVENTION

A method for equalizing a digital quadrature amplitude modulated (QAM) signal is disclosed. An apparatus for performing this method is also disclosed. The method includes steps of receiving the digital QAM signal at an input of a band edge equalizer (BEE); band edge equalizing the digital QAM signal using the band edge equalizer; outputting from the band edge equalizer a band edge equalized digital QAM signal; receiving the band edge equalized digital QAM signal at an input of a symbol spaced equalizer (SSE); and symbol space equalizing the band edge equalized digital QAM signal using the symbol spaced equalizer to provide a symbol spaced equalized digital QAM signal.

This method may further include the steps of adapting filter coefficients of the band edge equalizer in response to a measure of channel distortion where the measure of channel distortion is obtained using the digital QAM signal. The method may include providing as the measure of channel distortion a measure of spectral energy in an upper and a lower band edge of a base-band spectrum where the base-band spectrum is obtained using the digital QAM signal; and adapting the filter coefficients of the band edge equalizer in response to the measure of spectral energy. This base-band spectrum may be the base-band spectrum of the band edge equalized digital QAM signal output by the band edge equalizer.

The step of adapting the filter coefficients of the band edge equalizer may include the steps of providing an adaption coefficient; and adapting the filter coefficients of the band edge equalizer in response to this adaption coefficient.

The step of symbol space equalizing the band edge equalized digital QAM signal may include the step of adapting filter coefficients of the symbol spaced equalizer in response to a measure of channel distortion where the measure of channel distortion is obtained using the digital QAM signal. The measure of channel distortion in this step may be obtained from the symbol spaced equalized digital QAM signal output by the symbol spaced equalizer.

The step of adapting the filter coefficients of the symbol spaced equalizer may include the steps of adapting the filter coefficients of the symbol spaced equalizer in a blind equalization mode; and adapting the filter coefficients in a decision directed mode wherein the decision directed mode occurs after the blind equalization mode. The blind equalization mode may include the step of executing a constant modulus algorithm, executing a zero forcing algorithm, or executing both a constant modulus algorithm and a zero forcing algorithm. The blind equalization mode may include the step of executing a reduced constellation algorithm; or other algorithm.

The step of adapting the filter coefficients of the symbol spaced equalizer in a decision directed equalization mode may include the steps of providing an estimate of an error between a received QAM symbol being equalized and a corresponding transmitted symbol $x_n$; and estimating $x_n$ using the least mean square of a probability density function of the digital quadrature amplitude modulated signal.

The symbol spaced equalizer may be split into a linear pre-cursor equalizer, such as a feed forward equalizer, and a decision feedback equalizer to perform the symbol spaced equalization. The linear pre-cursor equalizer produces an interim equalized QAM signal which is then equalized by the decision feedback equalizer to provide the symbol spaced equalized digital QAM signal.

The digital QAM signal provided to the band edge equalizer may or may not be demodulated at this point. In particular, demodulation can occur either before or after band edge equalization. The digital QAM signal may or may not have been interpolated and resampled at a new sampling frequency. If interpolation and resampling is used in a particular embodiment, these operations may occur either before the BEE, before the SSE or both. The resampling rate will typically be some multiple of the symbol rate, such as the symbol rate itself, for example as used by the SSE disclosed herein.

The method disclosed may perform the step of match filtering the digital QAM signal either before or after band edge equalizing the digital QAM signal to produce a match filtered digital QAM signal.

Embodiments of the invention decimate the sampling frequency of the band edge equalized digital QAM signal prior to receiving the band edge equalized digital QAM signal at the input of the symbol space equalizer. This sampling frequency may be decimated to the symbol rate.

In the disclosed method, the digital QAM signal that is received by the band edge equalizer typically has a sampling frequency that is high enough to limit aliasing in the digital QAM signal prior to band edge equalization. This sampling frequency may, but need not, be a multiple of a symbol rate of the digital QAM signal, such as two times the symbol rate. The method may reduce the sampling frequency of the band edge equalized digital QAM signal prior to the step of symbol space equalizing the band edge equalized digital QAM signal. Thus, the sampling frequency of the digital QAM signal going into the band edge equalizer may be about two times a symbol rate of the digital QAM signal, and the sampling frequency of the band edge equalized digital QAM signal going into the symbol spaced equalizer may be reduced to the symbol rate, for example.

The foregoing techniques provide cost reductions and flexibility in QAM equalization without substantially affecting performance.

BRIEF DESCRIPTION OF THE DRAWINGS

The foregoing aspects of the invention as well as other features and advantages thereof can be understood from the following detailed description when read in conjunction with the accompanying drawings where.

DETAILED DESCRIPTION

Embodiments of the invention provide a novel method and apparatus for equalizing noisy or otherwise distorted digital QAM signals. The following description is presented to enable a person skilled in the art to make and use the invention. Descriptions of specific embodiments are provided only as examples. Various modifications to the described embodiments may be apparent to those skilled in the art, and the generic principles defined herein may be applied to other embodiments and applications without departing from the spirit and scope of the invention. Thus, the present invention is not intended to be limited to the expressly described or illustrated embodiments, but is to be accorded the widest scope consistent with the principles and features disclosed herein.

The present embodiment is described in the context of a cable television (CATV) environment (which is assumed to be more stringent then a satellite environment). In such an environment, a number of factors may degrade a QAM signal, such as the noise figures of amplifiers, amplifier linearity (e.g. intermodulation products), cable loss, ingress, channel loading (e.g. differential power between channels), and other system limitations. To optimize system performance all of these factors should be identified and properly planned for in the system design, deployment and maintenance. Embodiments of the invention might also be used in, but are not limited to, applications such as satellite, DVB, DAVIC, IEEE 802.14, or ADSL-CAP systems, for example. Embodiments of the invention can be used with a wide range of carrier frequencies, baud rates, and QAM constellations.

Figure 1:
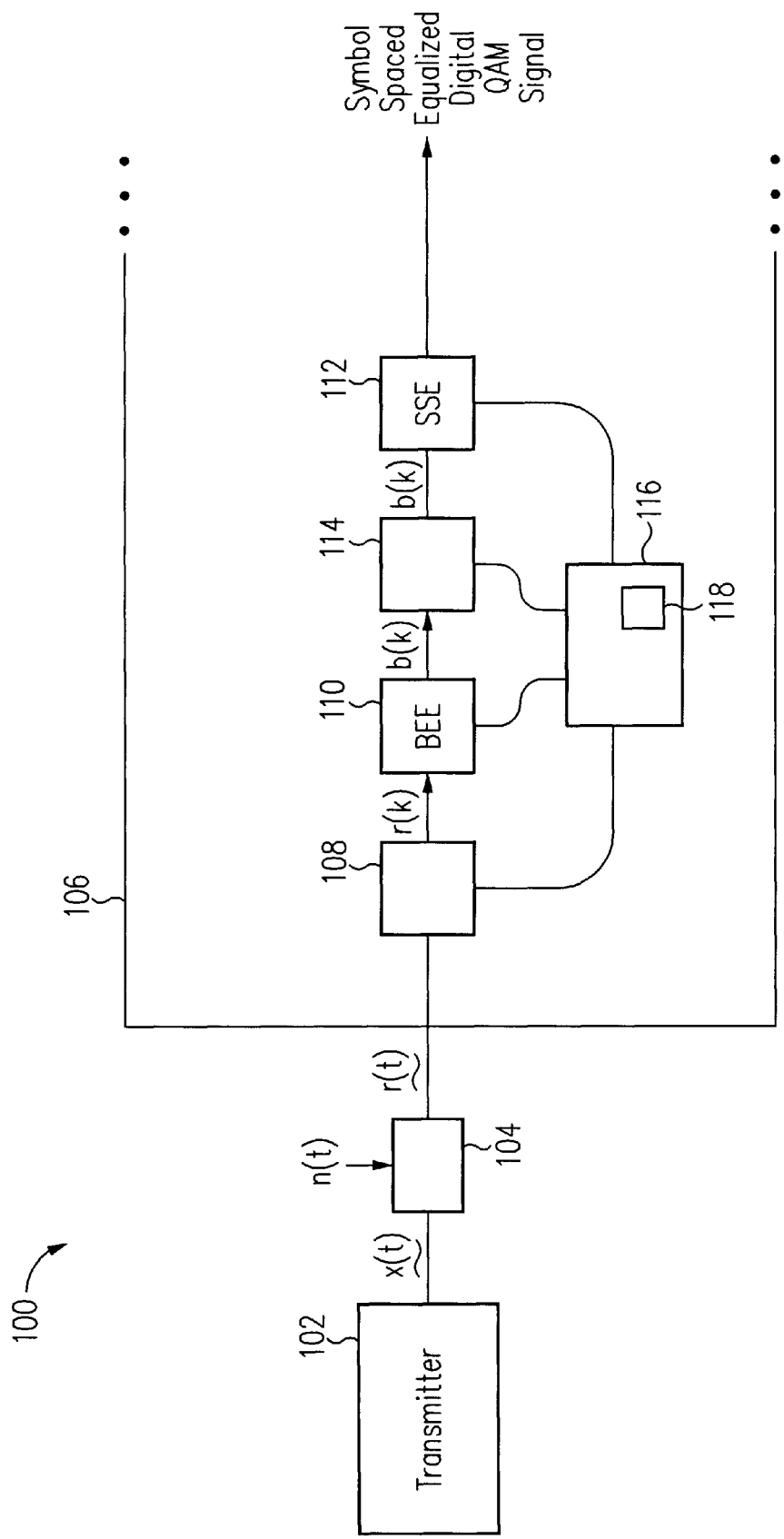
FIG. 1 illustrates system 100 having a receiver 106 that includes an embodiment of the present invention.

System 100 of FIG. 1 illustrates an embodiment of the present invention. This system includes transmitter 102, transmission channel 104 and receiver 106. The transmitter is coupled to the receiver through the transmission channel 104. This channel can be any type of transmission channel, such as fiber optic, wire, cable, wireless (e.g. RF), infrared and so forth. x(t) represents the transmitted signal, r(t) represents the received signal and n(t) represents noise introduced during the transmission. Receiver 106 is a digital receiver that includes a pre-band edge equalizer circuit 108, band edge equalizer (BEE) 110, post-band edge equalizer circuit 114 and symbol spaced equalizer (SSE) 112. It also includes a controller 116 that includes microprocessor 118. The controller 116 and microprocessor 188 can be used to control circuitry in the present embodiment, as well as implement operations of the described circuits if desired For example, the controller could be used to implement demodulation, synchronization and/or clock recovery operations, as well as, perform equalization functions.

In operation, an analog quadrature amplitude modulated (QAM) signal x(t) is transmitted by the transmitter 102 across channel 104. The transmitted signal is typically affected by noise n(t). The receiver 106 receives the analog QAM signal r(t) and provides it to circuit 108. Circuit 108 represents all of the circuits that process the received QAM signal prior to providing the received QAM signal to the band edge equalizer 110. This circuit 108 can include whatever circuitry is desired in a particular embodiment of the invention. It includes circuitry that converts the analog QAM signal r(t) to a digital QAM signal r(k). It may include a demodulator circuit The digital QAM signal r(k) is provided to the band edge equalizer 110. The BEE 110 equalizes the digital QAM signal r(k) and outputs a band edge equalized digital QAM signal b(k) to the circuit 114. The circuit 114 represents all of the circuits that process this band edge equalized digital QAM signal b(k) after it is output by the band edge equalizer (BEE) 110, but before this signal b(k) is input into the symbol spaced equalizer 112 for further equalization. This circuit 114 may contain whatever circuitry is desired in a particular embodiment of the invention. The circuit 114 may modify the frequency of the digital QAM signal, for example. The circuit 114 might be directly electrically coupled the equalizer 110 to the equalizer 112 without any intervening processing circuits. After the band edge equalized digital QAM signal b(k) is input into the symbol spaced equalizer 112, the equalizer 112 further equalizes the band edge equalized signal and outputs the symbol spaced equalized digital QAM signal. The QAM symbols are then determined from the symbol spaced equalized QAM signal by a QAM detector (not shown).

Figure 5:
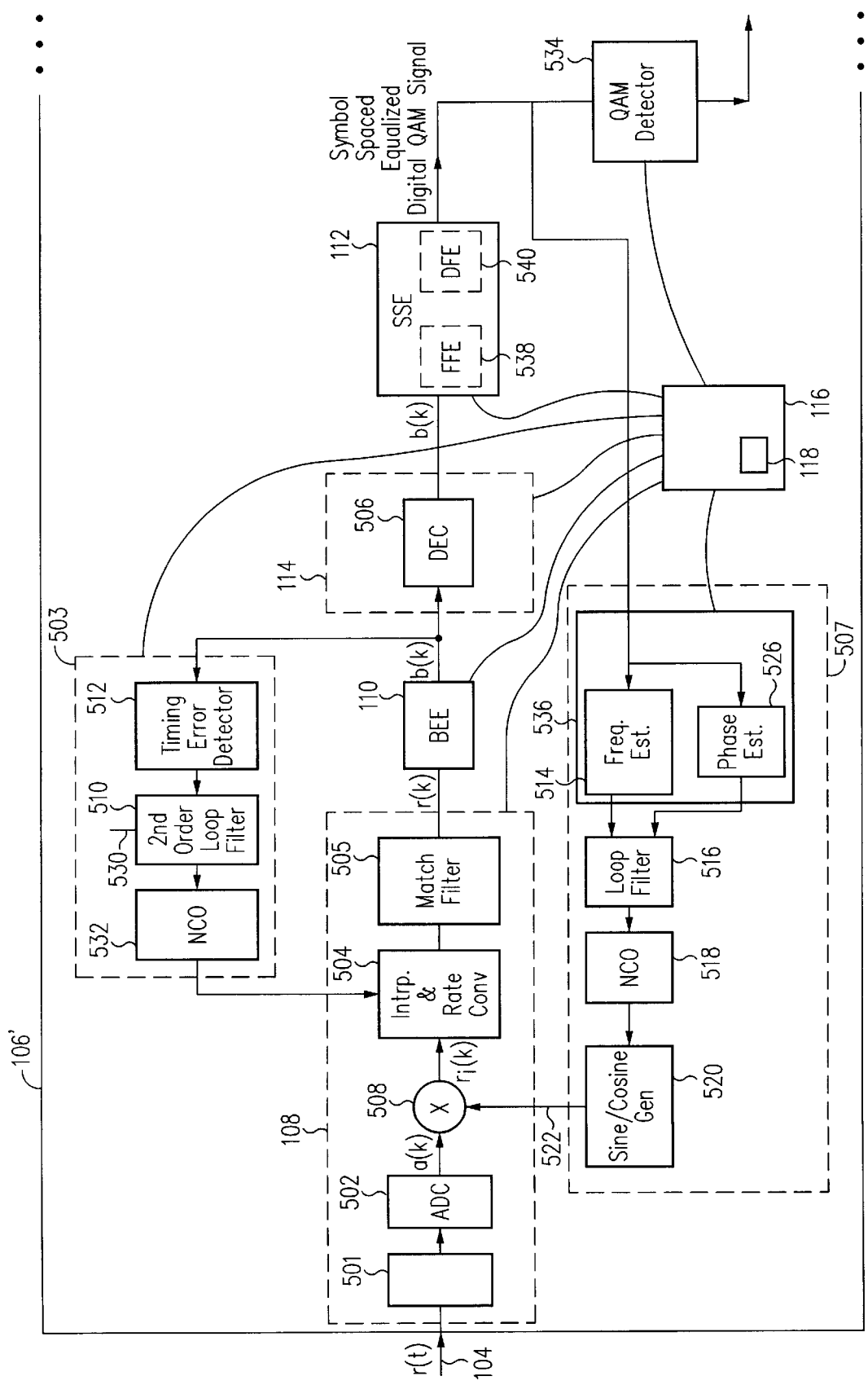
FIG. 5 illustrates a receiver 106' that includes an alternate embodiment of the present invention.

FIG. 5 illustrates a receiver 106' that includes particular circuitry in the circuits 108 and 114. Receiver 106' also includes clock recovery circuit 503 and carrier synchronization circuit 507. Embodiments of the invention need not be used in conjunction with this particular circuitry 108, 114, 503 and 507, however. BEE/SSE combinations can be used to filter any appropriate digital QAM signal that is received at the input of a BEE where the resulting band edge equalized digital QAM signal can be subsequently filtered by an SSE. Band edge equalized digital QAM signal shall refer to the signal b(k) that has been output by the BEE 110 and to the signal that is input to the SSE 112 whether or not there is intervening processing by the circuit 114 that modifies the signal b(k) in some manner.

As shown in FIG. 5, the circuit 108 of receiver 106' includes a conventional tuner 501, an analog to digital converter (ADC) 502, a demodulator 508, an interpolator and rate conversion circuit 504 and a matched filter 505. The ADC 502 digitizes the received analog QAM signal by sampling it at some appropriate frequency to produce the digital QAM signal a(k). In a typical case, the sampling clock used by the ADC 502 might end up having a frequency in a range of about four to eight times the symbol frequency of the received analog QAM signal r(t), for example. The symbol frequency Fb of r(t) might be 3.5 to 7 Msymbols/sec (Msps).

The ADC's sampling clock need not be synchronized to the symbol frequency of r(t). In addition, the sampling clock need not be derived from the incoming signal r(t). Referring to FIG. 5, after sampling the QAM signal at the ADC 502, an interpolator and rate conversion circuit 504, discussed below, resamples the QAM signal at a frequency that is appropriate for proper QAM detection by detector 534. Because the ADC 502 does not need to use a clock that is derived from the incoming signal, a local oscillator can provide the sampling clock. The sampling clock provided by the local oscillator generally will be of a much higher quality if it has a fixed frequency. A sampling clock that is recovered from the QAM signal may be variable due to the use of a phase locked loop, for example, possibly reducing sampling performance. The sampling and resampling approach implemented in the present embodiment using the ADC 502 in combination with the circuit 504 enables the sampling clock of the ADC 502 to have a fixed frequency, rather than a variable frequency that might be produced by a PLL, for example.

After converting the analog QAM signal to a digital QAM signal, the digital QAM signal is demodulated by demodulator 508. This demodulator 508 can use conventional digital demodulation circuitry. It uses the feedback signal 522 from the synchronization circuit 507.

With reference to FIG. 5, timing in the digital receiver 106' is synchronized to the symbols of the incoming data signal a(k) using synchronization circuit 507 and the clock is recovered using clock recovery circuit 503. Timing and clock recovery is adjusted by these circuits 503 and 507 to provide optimum detection by the detector 534 of the QAM symbols. Because the present embodiment is implemented digitally, it may be desirable to synchronize and perform clock recovery in the digital domain. Digital synchronization and clock recovery may be more accurate and less subject to drift than analog techniques. Analog techniques may synchronize using a feedback loop to adjust the phase and frequency of a local clock, for example, based upon the timing of the incoming signal. Implementing the clock recovery and synchronization circuits digitally generally will not be as expensive because the present embodiment uses digital processing already (e.g. BEE 110 and SSE 112) and the required functions for digital synchronization and clock recovery can be integrated with the other digital circuitry.

As shown in FIG. 5, the synchronization circuit 507 includes the conventional digital circuitry 536, loop filter 516, numerically controlled oscillator (NCO) 518 and sine/cosine generator 520 coupled in series between the output of the SSE 112 and an input to the demodulator 508. The conventional digital circuitry 536 includes the frequency estimator 514 and phase estimator 526. The circuitry 536 estimates frequency and phase estimation of the received signal r(t) using the output from the SSE 112 using conventional techniques. The circuitry 536 outputs the frequency and phase estimates to the loop filter 516 of the synchronization circuit 507. Please see Webb and Hanzo, *Modem Quadrature Amplitude Modulation,* IEEE Press, New York, 1995, Ch. 6 for a discussion of carrier and clock recovery from QAM signals.

Figure 12:
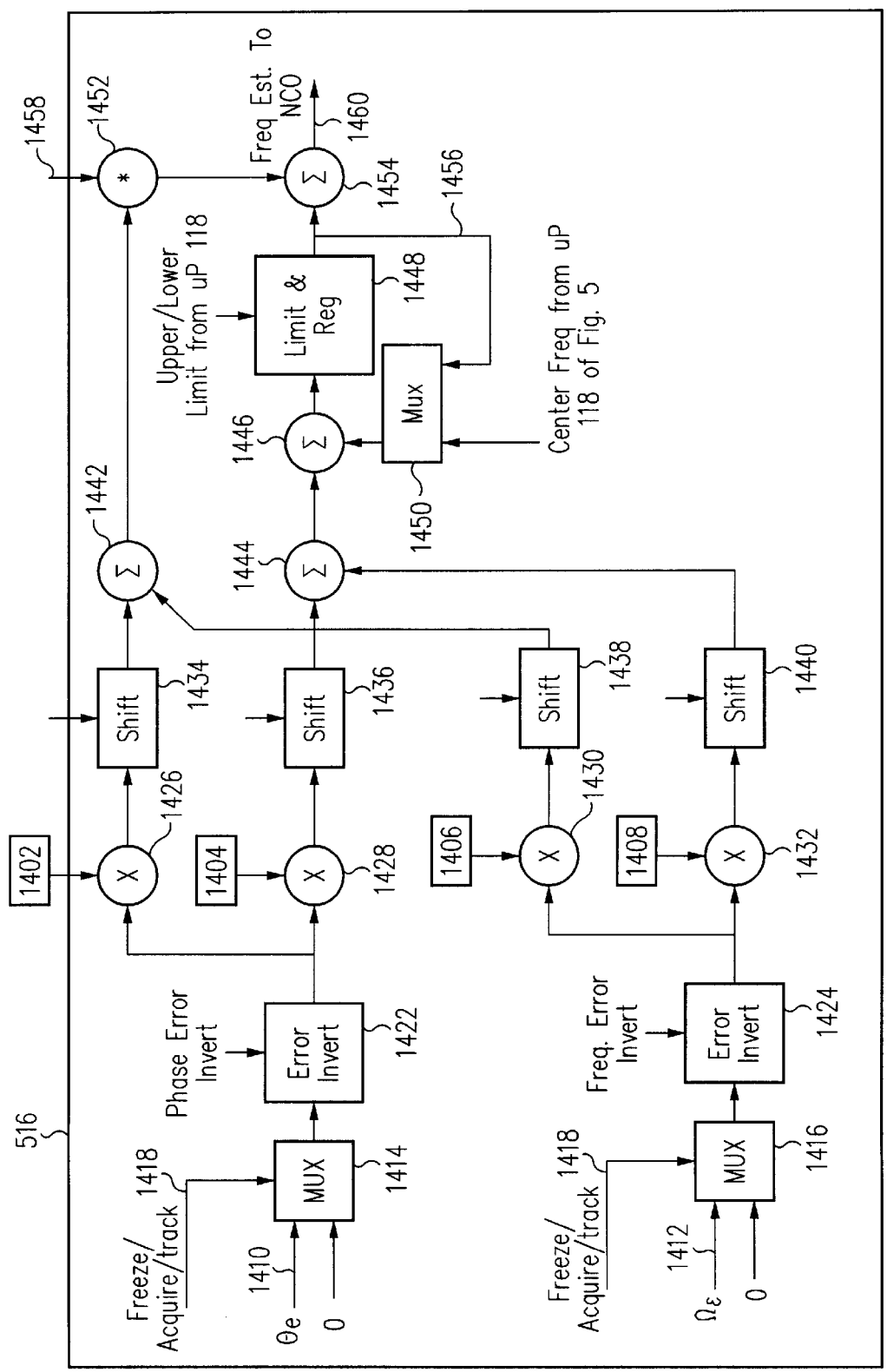
FIG. 12 illustrates a loop filter used in a QAM clock synchronization circuit.

The exemplary loop filter 516 shown in FIG. 5 is a two input, single output device. Such a filter is used to allow decoupling of the frequency and phase estimates provided by the circuits 514 and 526 because the errors and noise from these circuits in general will be correlated. Adequate performance for the present loop filter 516 can be achieved using a simple lead/lag control loop. Such a control loop is shown in the loop filter 516 of FIG. 12. In this loop filter 516, the estimated phase $\hat{\Theta}$ is provided to the input 1410. The estimated frequency $\hat{\omega}$ is provided to the input 1412. To improve performance in the lock time, the filter 516 selects two of the gains 1402, 1404, 1406 and 1408 depending upon whether the acquire/track control signal provided to inputs 1418 indicates that the loop filter is acquiring a frequency estimate or tracking a frequency estimate. Box 1402 represents the mantissa exponent of the carrier frequency lead gain. Box 1404 represents the mantissa exponent of the carrier frequency lag gain. Box 1406 represents the mantissa exponent of the carrier phase lead gain. Box 1404 represents the mantissa exponent of the carrier phase lag gain. Each of these gain elements have an acquisition and tracking value control loop. Selecting two of these four gains based upon the acquire/track control signal will improve the acquisition time without degrading the steady state phase noise introduced by the filter 516. The output 1460 of the loop filter 516 is provided to the NCO (numerically controlled oscillator) 518 as shown in FIG. 5.

Figure 13:
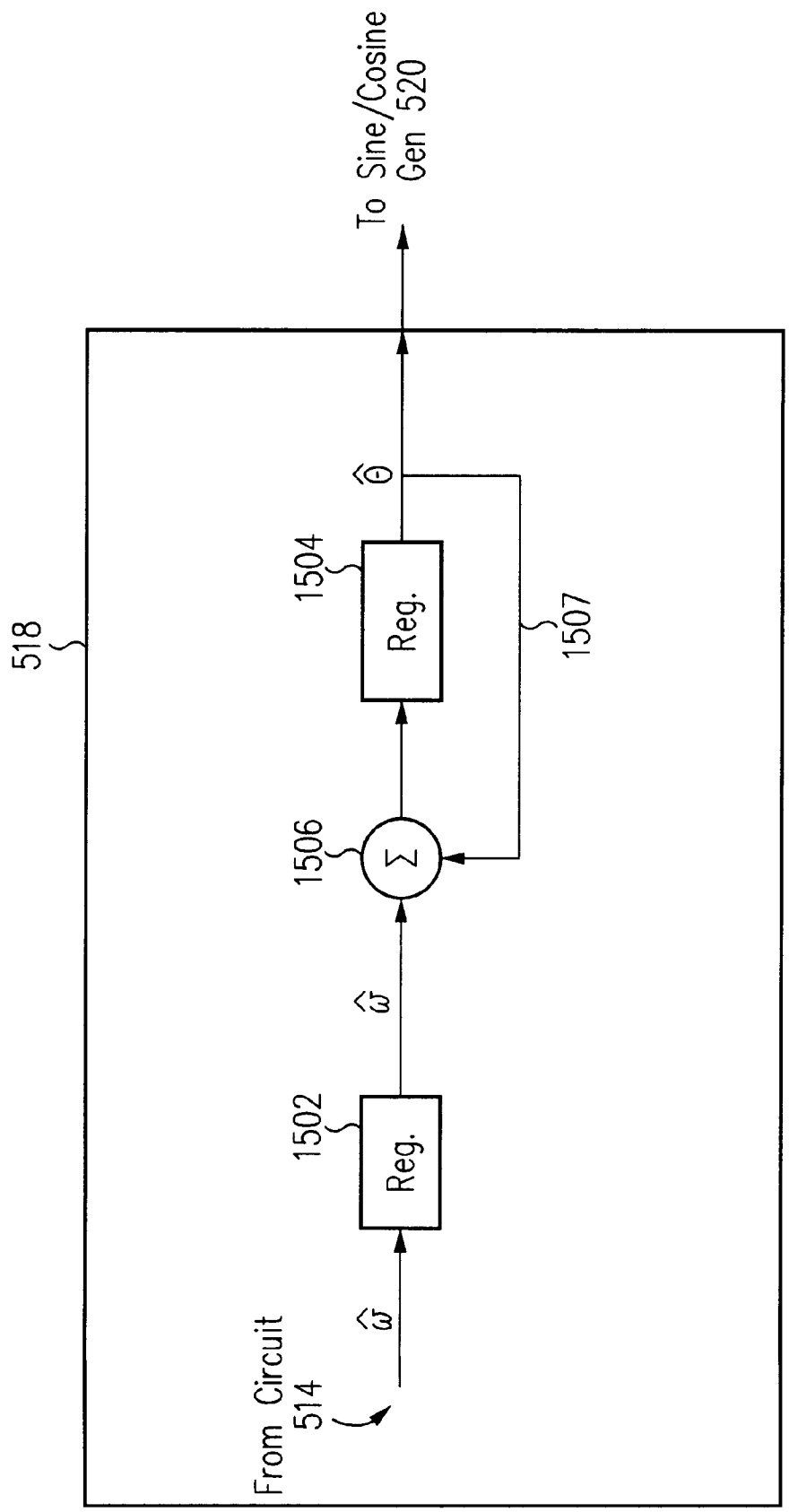
FIG. 13 illustrates a numerically controlled oscillator used in a QAM clock synchronization circuit.

Upon receiving the signal from the loop filter 516, the numerically controlled oscillator (NCO) 518 of FIG. 5 estimates the phase of the received signal r(t) to be modulo some power of 2 in the following manner. An expanded view of the NCO 518 is shown in FIG. 13. This NCO 518 includes registers 1502 and 1504, summer 1506 and feedback loop 1507. The registers 1502 and 1504 are initialized to zero when the circuit 518 is first powered up. In operation, the estimated carrier frequency $\hat{\omega}$ is latched into register 1502. The register 1502 provides the latched estimate $\hat{\omega}$ to the summer 1506. The feedback loop 1507 provides to the summer 1506 a previous phase that has been stored in the register 1504. The output of summer 1506 is a new phase $\hat{\Theta}$. This new phase $\hat{\Theta}$ is then latched into register 1504 to replace the previous phase $\hat{\Theta}$. The phase $\hat{\Theta}$ provides the modulo power of two estimate of the phase of the received signal. This phase $\hat{\Theta}$ is output by the register 1504 to provide the estimated phase to the sine/cosine generator. In the present embodiment, this estimated phase is a fourteen bit word.

Again referring to the synchronization circuit 507 of FIG. 5, the modulo 2π signal output by the NCO 518 is provided to the sine/cosine generator 520. The circuit 507 uses the sine/cosine generator 520 to provide appropriate sine and cosine signals to the demodulator 508 for demodulation. To design the sine/cosine generator 520, the resolution required for the particular application needs to be determined. This resolution is set by the noise budget for the particular application. The present embodiment considers two sources of noise from the generator 520: the quantization of the sine and cosine components and the angular quantization on the input. For convenience these two noise sources are treated as being independent of each other. The total sine/cosine quantization noise $\sigma_q^2$ out of the generator 520 can be expressed as:

$$\sigma_q^2 = \frac{2^{-2n}}{6}$$

where n is the number of bits resolution used by the generator 520. The total noise power budgeted to the generator 520 is about 1 E-8 in the current embodiment. If the quantization noise $\sigma_q^2$ of the generator 520 contributes one half of this total noise power (i.e. $\sigma_q^2$=0.5 E-8), then the number of bits of resolution n is calculated to be 12.5. The present embodiment uses 12 bits resolution to quantize the sine and cosine components.

The noise introduced due to angular quantization error at the input to the generator 520 can be expressed as:

$$\sigma_a^2 = \frac{\pi^2 2^{-2n}}{12}$$

where "n" is the number of bits representing the angle. If this noise provides the other half of the estimated total generator noise 1 E-8, then this equation predicts that the input to the sine/cosine generator 520 should use 15 bits of resolution for angular quantization. The present embodiment actually uses 14 bits.

In the synchronization circuit 507 of FIG. 5, the "modulo power of 2π" phase estimate that is output by the NCO 518 is input to the generator 520. The range of the estimated phase that is input into the generator 520 is 360 degrees or 2π of the unit circle. Using this information, the generator 520 generates the sines and cosines of this estimated phase for use by the demodulator 508. The sine/cosine generator 520 can be implemented using a conventional sine/cosine generator.

With reference to FIG. 5, the demodulator 508 uses the sine and cosine signals generated by generator 520 to demodulate the signal a(k) output by the ADC 502 to provide the signal $r_f$(k). In the circuit of FIG. 5, the demodulator 508 could be located anywhere in the circuit path that extends between the input of the receiver 106' and the detector 534. For example, the demodulator 508 could be located between the SSE 112 and the detector 534. The demodulator could be located between the BEE 110 and the SSE 112. To enable QAM detection, the demodulator 508 precedes the detector 534.

As also shown in FIG. 5, the signal $r_f$(k) output by the demodulator 508 is provided to the interpolator and rate conversion circuit 504. The interpolator and rate conversion circuit 504 includes circuitry that interpolates between the samples of $r_f$(k) to produce an interpolated digital QAM signal. Interpolator and rate conversion circuit 504 also includes circuitry that resamples the interpolated QAM signal to produce a resampled digital QAM signal. This resampling circuitry resamples the interpolated QAM signal at a frequency that is some multiple of the symbol frequency Fb of the received analog QAM signal r(t). Such resampling is performed so that detection may be properly completed by the detection circuit 534. In the present embodiment, the interpolator and rate conversion circuit 504 uses a resampling frequency that is two times the symbol rate Fb of the received QAM signal, or about 7 to 14 Msps.

Referring to FIG. 5, the circuit 504 uses a clock recovered by the clock recovery circuit 503 to perform the resampling. This recovered clock enables the circuit 504 to determine the symbol rate of the incoming signal r(t). The clock recovery circuit 503 uses conventional digital clock recovery techniques to recover the clock from the digital signal b(k) that is output by the BEE 110. As shown in FIG. 5, the circuit 503 includes timing error detector 512, a second order loop filter 510, a numerically controlled oscillator (NCO) 532 and an acquisition/tracking control line 530. The clock recovery circuit 503 recovers the clock by first estimating the timing error error of the digitized signal b(k) using the timing error detector 512. After estimating the timing error, the estimated delay is provided to the loop filter 510. The output of the loop filter 510 is provided to the NCO 532 which provides an estimate of the symbol rate to interpolator and rate conversion circuit 504.

The timing error detector 512 can be a conventional circuit that estimates the timing error of the QAM signal using the band edge equalized output from the BEE 110. Conventional timing error detectors have used a "maximum likelihood function" which is a function of the timing error. A problem with this method is that the timing error error gain is a function of the data. As a result, this conventional technique introduces an error that is proportional to the data amplitude and therefore has data dependent noise in its output above what is necessary.

Conventional timing error detector techniques may be modified, however, to exploit the cyclo-stationary characteristics of the signal being processed. Such a modification may improve performance of the timing error detector while simplifying the detection algorithm. Such a timing error detector lends itself to a simpler interpretation. Such a modification can produce a timing error detector that is believed to be superior to conventional timing error detectors in that the timing error error estimate may be smaller than those of conventional techniques. A desirable estimate of the timing error to be provided by the timing error detector 512 is the least mean squared estimate obtained from the signal being processed.

The second order loop filter 510 of the clock recovery circuit 503 is a conventional loop filter. This filter 510 is designed to have a cutoff frequency that is low enough to minimize the bit error rate of the demodulator 508. The output of the loop filter 510 is provided to the NCO 532 of the clock recovery circuit 503.

The NCO in the clock recovery circuit 503 simply accumulates the center position of the desired output sample relative to the sample sequence incoming from the loop filter 510. The output of the loop filter is used to drive the NCO 532 to 2 times symbol rate. The NCO and associated control generate a fractional delay that is provided to the interpolator and rate conversion circuit 504 (range of −1 to 1 compatible with the circuit 504 in the present embodiment).

The interpolator and rate conversion circuit 504 can be located anywhere in the circuit path of FIG. 5 that extends between the output of the ADC 502 and the SSE 112. To enable QAM detection, the circuit 504 precedes the SSE 112. For additional information concerning interpolation and rate conversion, please see U.S. Pat. No. 5,504,785 entitled Digital Receiver For Variable Symbol Rate Communications, filed on May 28, 1993, issued on Apr. 2, 1996, having inventors Becker, Harris and Tiernan and U.S. Pat. No. 5,612,975 entitled Digital Receiver For Variable Data Rate Communications, filed on Jun. 16, 1994, issued on Mar. 18, 1997, having inventors Becker and Bilotta. Each of U.S. Pat. Nos. 5,504,785 and 5,612,975 is hereby incorporated herein by this reference. FIG. 5 illustrates that, in the present embodiment, the samples produced by interpolator and rate conversion circuit 504 are provided to the equalizer 110 through the matched filter 505. Alternate techniques for providing a digital QAM signal to the BEE 110 can be used. For example, any of the demodulator 508, the interpolator 504 and the matched filter 505 could be moved elsewhere in the circuit of FIG. 5, as described above. After the interpolator and rate conversion circuit 504 resamples the interpolated QAM signal at two times the symbol rate Fb, this circuit 504 provides its output to matched filter 505.

With reference to FIG. 5, the matched filter 505 is used to improve the SNR of the QAM detector 534 used downstream. The filter 505 could be positioned anywhere in the circuit path of FIG. 5 that extends between the input of the receiver 106' and the detector 534. Matched filtering occurs prior to the QAM detection performed by detector 534. In the present embodiment, the matched filter 505 receives its input from interpolator and rate conversion circuit 504. The QAM signal r(k) output by the matched filter 505 is sampled at two times the symbol rate Fb and is then provided to the BEE 110. This filter 505 is matched to the operation of the transmitter sending the QAM signal.

In the present embodiment, channel equalization can be performed with up to three different equalizers working together. These three equalizers include the band edge equalizer 110, the symbol spaced equalizer 112 and the decision feedback equalizer 540. The SSE 112 may be split into a feed forward equalizer (FFE) 538 and a decision feedback equalizer (DFE) 540. Of these equalizers, the BEE 110 is simple and will not add significantly to the cost of the present embodiment. Using the BEE 110 also enables a less expensive symbol spaced equalizer 112 to be used down stream. Accordingly, using these two or three equalizers minimizes the amount of computation required without compromising the performance of the system. In particular, the combination of the BEE 110 and the SSE 112 enable acceptable equalization to be achieved with less expense than some conventional equalization techniques.

The equalizers 110, 112, 538 and 540 used in the present embodiment adapt by attempting to minimize the least mean squared difference between the output of the SSE 112 and a discrete form of the transmitted signal x(t) shown in FIG. 1. This approach typically requires that an estimate of the error between the output of the SSE 112 and the transmitted signal x(t) be estimated. Because the transmitted signal x(t) is unknown, the adaptive algorithms discussed below use a variety of methods to estimate this error $e_n$. Using the error estimate $e_n$, the LMS (least mean squared) algorithm can be used to generate values that will update the coefficients of the equalizers. This algorithm is simple, efficient and low cost. A main disadvantage is slow convergence time. An alternative to the LMS algorithm is the LS (least squares) algorithm. Using the LS algorithm can be more expensive, but typically provides better performance. The RLS (recursive least squares) algorithm provides an intermediate method that might be used. It is often less expensive than the LS algorithm, but may provide nearly the same level of performance. Please see Proakis, J. G. et al, Advanced Digital Signal Processing, Macmillan Publishing, New York, 1992, Ch. 6 for a discussion of such algorithms. The present embodiment uses the LMS algorithm which is believed to be sufficient to meet the needs of the present context.

Figure 2A:
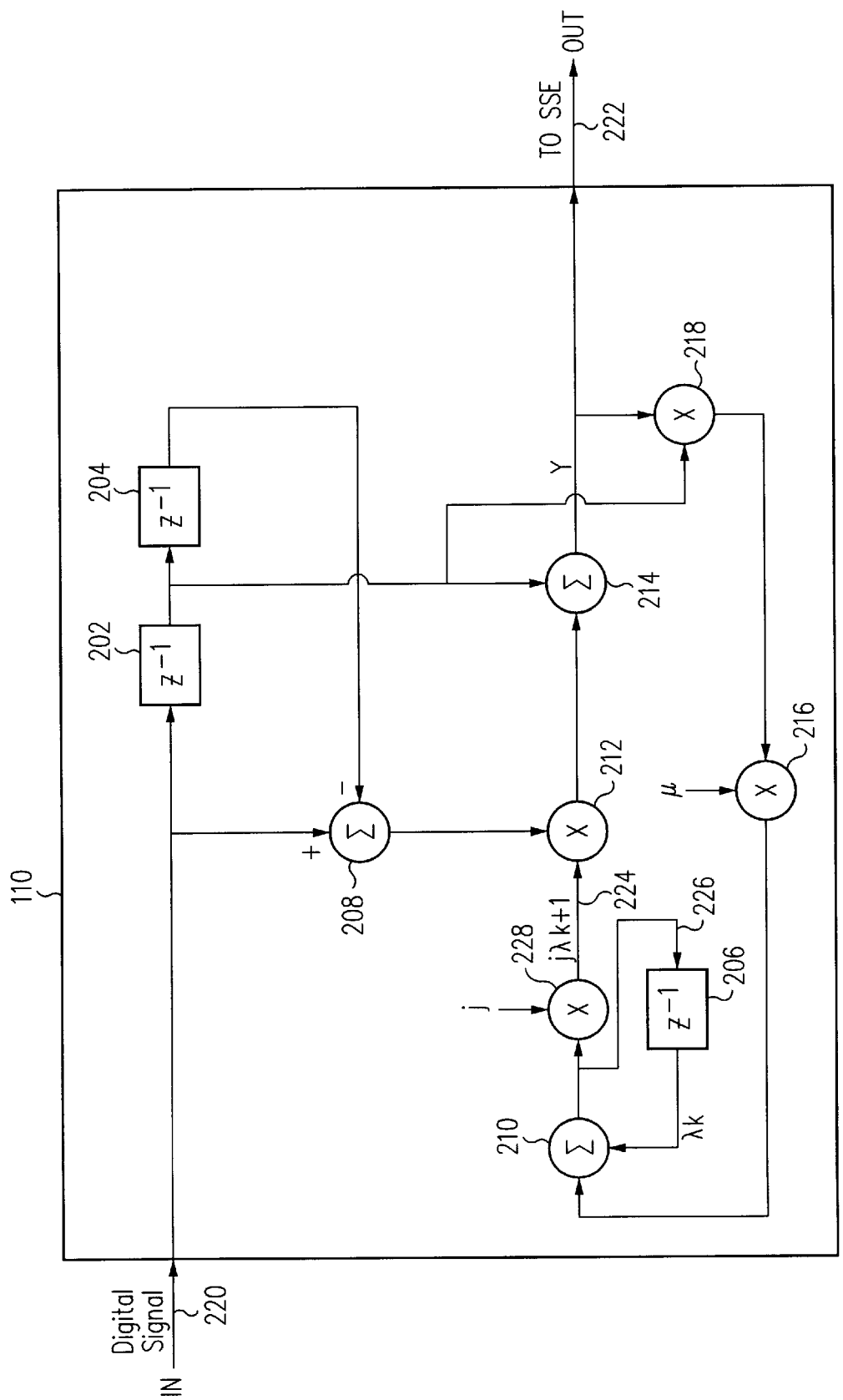
FIG. 2A illustrates a band edge equalizer filter that can be used by an embodiment of the present invention.

FIG. 2A illustrates details of the band edge equalizer 110. The BEE 110 has a BEE input 220 and a BEE output 222. It also includes delays 202, 204 and 206 each having a duration of one symbol period T at the symbol frequency of r(t). Equalizer 110 also includes adders 208, 210 and 214, and multipliers 212, 216, 218 and 228. The BEE input 220 is coupled to an input of the delay 202 and to an input of the adder 208. The output of delay 202 is coupled to an input of the delay 204, and the output of delay 204 is coupled to a second input of the adder 208. The output of delay 202 is also coupled to an input of the adder 214 and to an input of the multiplier 218. The output of adder 208 is coupled to an input of multiplier 212. The output of adder 214 is coupled to the BEE output 222 and to an input of multiplier 218. The output of multiplier 218 is coupled to an input to multiplier 216. An adaption coefficient $\mu$ is coupled to an input of multiplier 216. An output of multiplier 216 is coupled to an input of adder 210. The output of adder 210 is coupled to an input of multiplier 228 and is coupled using a feedback path 226 that includes the delay 206 to an input of the adder 210. Multiplier 228 multiplies by "j" the signal that is output by the adder 210. The output of multiplier 228 is provided to the input of multiplier 212. The output of multiplier 212 is input to the adder 214.

The discrete transfer function of the band edge equalizer 110 of FIG. 2A is $$H(z)=j\lambda(z^{-2}-1)+z^{-1} \qquad (1)$$

where $\lambda$ is a coefficient that varies depending upon the amount of noise, $z^{-1}$ is the duration T of the delays in FIG.

2A where T is the symbol period at the symbol frequency of r(t), and $z^{-2}$ is the duration 2T. In the frequency domain, the transfer function of the equalizer 110 can be expressed as $$H(\omega)=1+\sin(\lambda\omega). \qquad (2)$$

The BEE 110 is intended to reduce intersymbol interference that the subsequent SSE 112 typically will be unable to correct. To achieve this result, the circuit 900 of FIG. 10 calculates the filter coefficient $\lambda$ of equation (1) such that the BEE 110 minimizes the intersymbol interference that occurs at the symbol times. The circuit 900 evaluates the spectral energy in the upper and lower band edges of the base-band spectrum to adapt the coefficient $\lambda$. This coefficient $\lambda$ is recalculated each time a new symbol is being filtered, causing the BEE 110 to adapt to more accurately filter out noise as the noise changes. The coefficient $\lambda$ should be limited such that $|\lambda|<\frac{1}{2}$.

Figure 10:
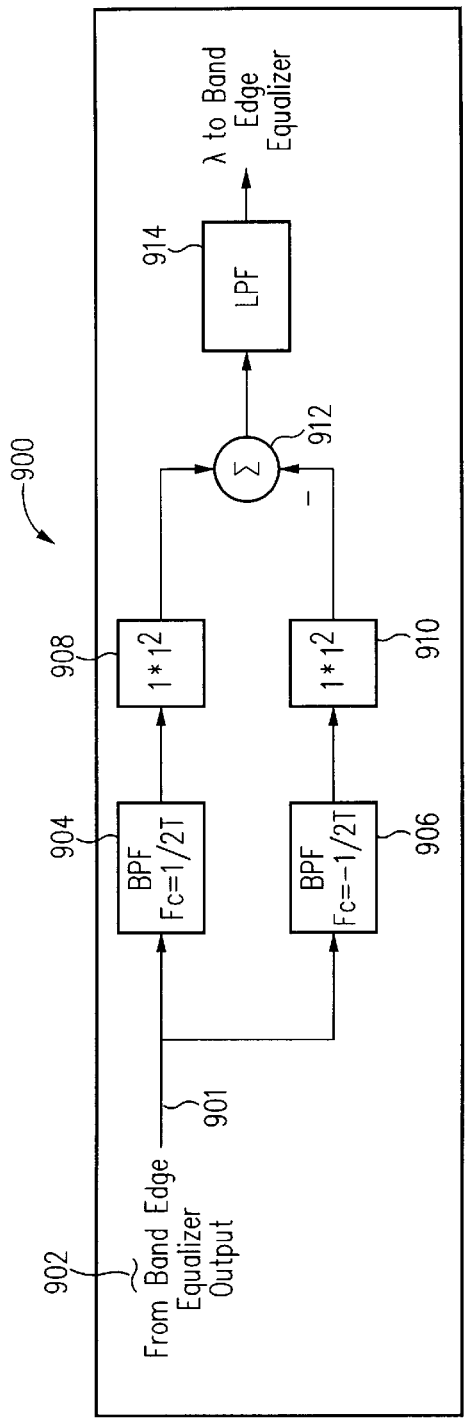
FIG. 10 illustrates an adaption circuit for a band edge equalizer used in an embodiment of the present invention.

As shown in FIG. 10, the circuit 900 includes an input 901, band pass filters 904 and 906, squarers 908 and 910, subtracter 912 and low pass filter 914. The input signal 902 to this circuit 900 is taken from the output of the BEE 110. This signal 902 is passed through band pass filters 904 and 906 where it is band limited. The BPF's 904 and 906 are centered about the frequency 1/(2T). In the present embodiment, the adaption circuit 900 should not introduce or cause unacceptable levels of noise and it should complete acquisition in an acceptable acquisition time. To achieve these goals, the bandwidth of the band pass filters 904 and 906 has been chosen to be comparable to the transition bandwidth of the signal 902. A worst case considered, where the BPF bandwidth is the least comparable to the transition bandwidth, occurs when alpha (excess bandwidth)=0.1 for the filters 904 and 906 and when the symbol rate of the signal 902 is 3.5 MHz. Under these circumstances, the transition bandwidth is 350 KHz, and the output of the bandpass filters should be designed to have 700 KHz degrees of freedom per second (or equivalently, the output can be decimated to 350 KHz complex without information loss).

The band pass filtered (BPF) signals output by the band pass filters 904 and 906 are provided to the respective squarers 908 and 910, where the BPF signals are squared. If the output of each of the filters 904 and 906 is considered Gaussian, each sample in the squared signals will have a mean power that is equal to the power of the band of the BPF signal from which the squared signal was derived. Each sample of the squared signals will also have a matching variance at the 350 KHz rate. Therefore, the output of the squarer can be considered to have a SNR equal to 1 for each sample at the 350 KHz rate.

The squared signals are passed through the subtracter 912. The subtracter 912 outputs a signal that represents the difference between the two squared signals. This difference signal output by the subtracter 912 will have an SNR equal to about 0.5, assuming that the input signals are both approximately Gaussian. This SNR is further improved by passing the difference signal through the low pass filter 914. The low pass filter 914 increases the SNR by a factor equal to the ratio between the time constant of the filter 914 and the time constant of the bandpass filters 904 and 906. As an example if, the low pass filter 914 has a bandwidth of 1 KHz, then the SNR of the low pass filtered signal will be improved by a factor of 350, for a total SNR of 350*0.5=175=22.4 dB. These relationships can be used to determine the bandwidth of the LPF 914 that is required for the desired system performance.

The variable $\lambda$ output by the circuit 900 and used in equations (1) and (2) is an estimate of $\lambda_t$, the true value of lambda. $\lambda$ can be considered to be the sum of $\lambda_t$ plus an error value $\lambda_e$. The output of the BEE 110 when using the value $\lambda$ can be compared to the output of a "best" unknown BEE filter using another estimate $\hat{\lambda}_t$ of $\lambda_t$. The difference between the output of the BEE 110 when using $\lambda$ and the output of the best unknown BEE is considered to be the noise or error $x_e$ introduced by the circuit 900. This error $x_e$ is then given by $$x_e = H(z) - F(z) = j\lambda_e(x_{n-1} - x_{n+1}) \qquad (3)$$

where $x_n$ is the particular sample for which the error is being calculated, $x_{n-1}$ is the sample that preceded $x_n$, $x_{n+1}$ is the sample that follows $x_n$, H(z) is the transfer function of the BEE 110 and F(z) is the transfer function of the "best" unknown BEE. As discussed below, this error $x_e$ is part of a cost function that may be used to calculate $\lambda$.

Figure 11:
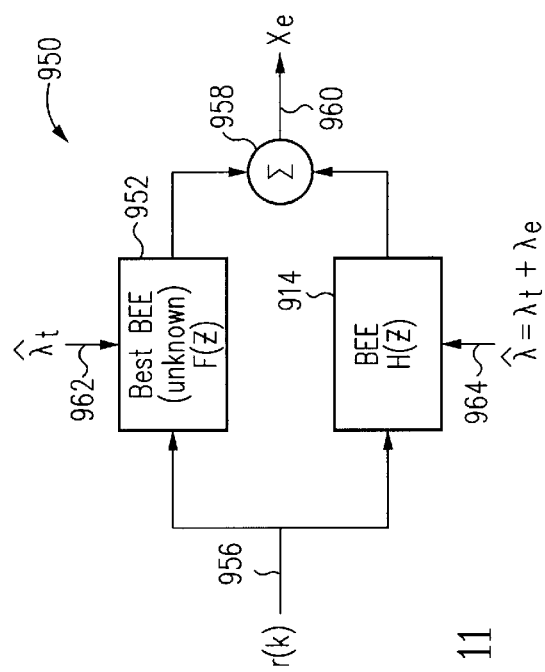
FIG. 11 illustrates a circuit that might be used by the circuit of FIG. 10 to determine an error $x_e$.

A circuit 950 that performs this comparison between the output of the circuit 900 and the output of the best unknown BEE is shown in FIG. 11. The circuit 950 of FIG. 11 includes an input 956, output 960, BEE inputs 962 and 964, adder 958, a "best" unknown BEE 952 and the BEE 110. The signal r(k) (FIG. 5) is input into the BEE 110 and into the best unknown BEE 952. The outputs of equalizers 110 and 952 are input into adder 958 which outputs the difference (i.e. H(z) −F(z)) of these two outputs. The output $\lambda$ of the circuit 900 is input into the BEE 110 through input 964. The BEE 952 is implemented in the same manner as the BEE 110 except that the second lambda estimate $\hat{\lambda}_t$ is provided to the input 962.

If all of the variables in equation (3) are considered to have a zero mean and $\lambda_e$ and the sample $x_n$ are uncorrelated, then the noise power of the error $x_e$ is $$E\{x_e^2\}=2*E\{\lambda_e^2\}*E\{x_n^2\} \qquad (4)$$

If the power $E\{x_n^2\}$ of the signal output by the LPF 914 is nominally 6.2 E-4 and the noise budget for the adaption control circuit is 6 E-8 (i.e. $E\{x_e^2\}$=6 E-8), then the power of the error $E\{\lambda_e^2\}$ will be less than 4.8 E-5. It should be noted that because $E\{\lambda_e^2\}$ is proportional to the power of the $\lambda$ signal, $E\{x_e^2\}$ is actually independent of this power. The worst case noise introduced by the LPF 914 occurs when $\lambda_t$=0.5. A benefit of using this signal 902 is that processing errors typically will be self-canceling, improving the performance of the circuit 900 in terms of the achievable SNR at its output.

Assuming that the errors in $\lambda$ are uncorrelated from one signal sample to the next (relative to the allowable bandwidth of the LPF 914, then the circuit 900 may need to further improve the SNR of the error estimate $x_e$. Accordingly, other mechanisms can also be used to adjust the BEE 110.

The error estimate $x_e$ can be further improved first by adjusting the bandwidth of each of the BPF's 904 and 906 to maximize the SNR of $\lambda$. The resulting improvement in the SNR of $x_e$ generally will be small (3–6 dB) and may not provide the desired performance improvement. The SNR of $x_e$ may also be improved by exploiting the structure of the signal 902 to filter out noise. For example, signal 902 is non-stationary (cyclo-stationary). This structure may be exploited to further reduce noise.

The BEE 110 illustrated in FIG. 2A shows a particular implementation of the lambda calculator circuit 900 of FIG. 10. In particular, in FIG. 2A the coefficient $\lambda$ is provided at the point 224 of FIG. 2A by circuitry that includes the multipliers 216, 218 and 228, the adder 210, the feedback path 226 and the associated inputs and outputs. This circuitry, which is functionally equivalent to the circuit of FIG. 10 implements the equation $\lambda_{k+1} = \lambda_k + \mu \nabla_\lambda C(\lambda)$ where $\nabla_\lambda C(\lambda) = j(X_0 - X_2)^* y$. $C(\lambda)$ is a function which shall be called "cost" and which provides an indication of the amount of noise in the particular QAM sample being processed. An example of such a function is $C(\lambda) = E\{x_e^2\}$ of equation (4), although alternate functions that provide an indication of noise may be used with embodiments of the present invention. Equation (4) can be expressed in terms of $\lambda$ in light of equation (3) and the fact that $\lambda_e = \lambda - \lambda_t$.

Figure 2B:
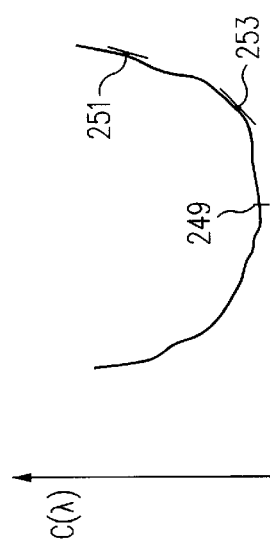
FIG. 2B illustrates a cost function used by the BEE of FIG. 2A.

The coefficient $\mu$ is an adaption coefficient that controls the adaption rate of the lambda calculator circuit shown in FIG. 2A. This coefficient $\mu$ is adjusted based upon the particular present value of $\lambda$ used to calculate the cost function of equation (4). In particular, FIG. 2B illustrates a plot of the cost function $C(\lambda)$ where point 249 represents the optimum value of $\lambda$ for best performance of the BEE 110. The coefficient $\mu$ will have a larger value if the present value of $\lambda$ is shown by point 251. The coefficient $\mu$ will have a smaller value if the present value of $\lambda$ is shown by point 253. $\mu$ is adjusted so that adaption in the direction of the optimum value 249 does not overshoot this optimum value.

The band edge equalizer 110 is used primarily to equalize the QAM signal near the signal's band edges due to the frequency response of the BEE 110. In particular, the equalizer 110 can adjust the relative amplitude of the signal at the upper and lower band edges. Referring to FIG. 5, when the sample rate of the band edge equalized signal b(k) is subsequently reduced down to the symbol rate Fb by the decimator 506, overlapping band edges will add properly to eliminate distortions that may be encountered when the QAM signal is equalized by the symbol spaced equalizer 112.

Figure 4:
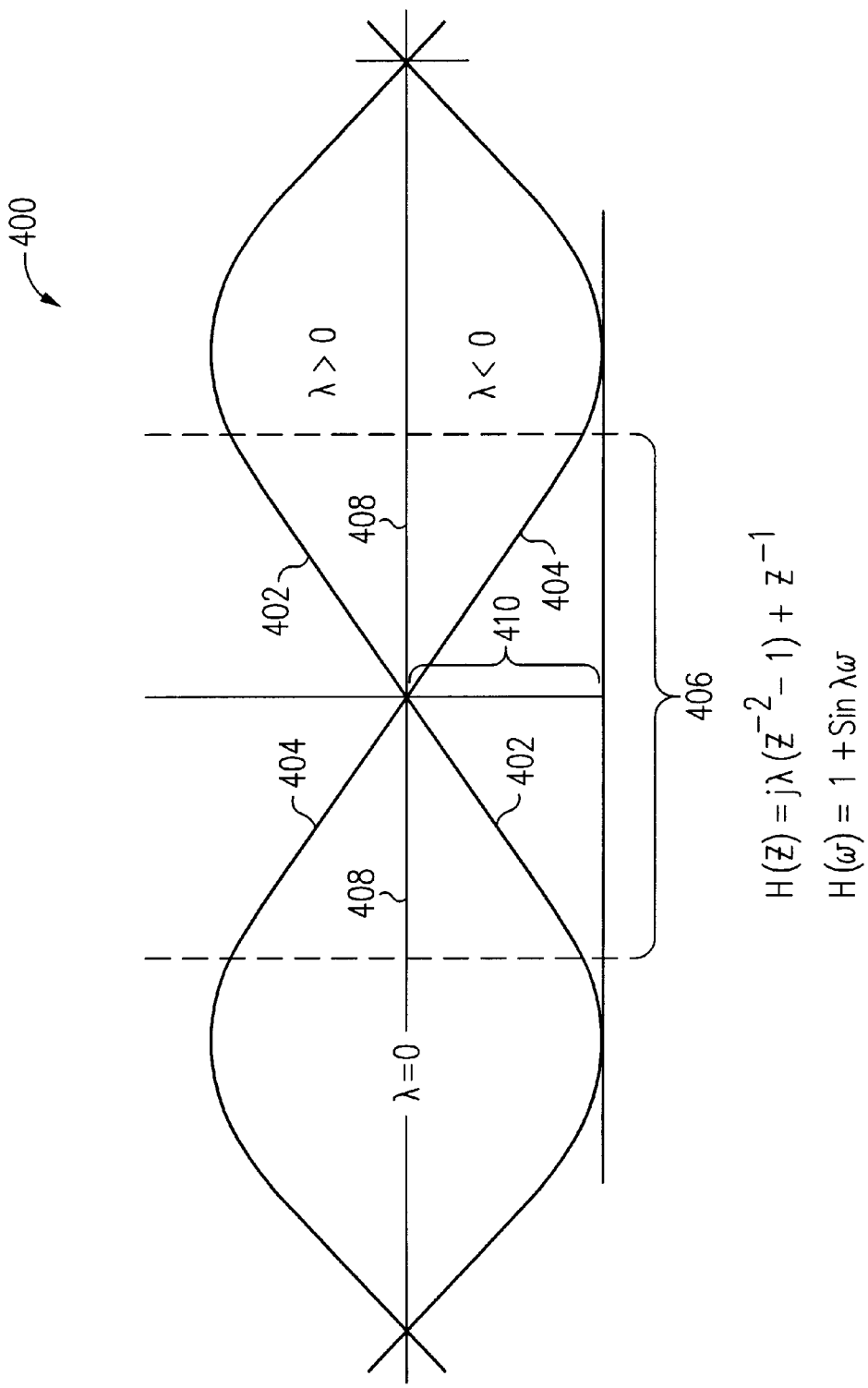
FIG. 4 illustrates the transfer function of the band edge equalizer filter of FIG. 2A.

The frequency response 400 of the BEE 110 of FIG. 2A is illustrated in FIG. 4. As shown, the equalizer 110 provides a sinusoidal type of frequency response having some d.c. offset 410. It should be noted that the frequency response 400 provides an amplitude slope only across the pass-band 406, its linear phase. Only this portion 406 of the frequency response 400 is used to equalize the signal being filtered. When $\lambda > 0$, the equalizer 110 equalizes the digital QAM signal provided to its input using the frequency response shown by the positive slope 402. When $\lambda < 0$, the equalizer 110 equalizes the digital QAM signal provided to its input using the response shown by the negative slope 404. A $\lambda = 0$ provides a flat frequency response 408. The actual value of $\lambda$ determines the actual slope of the frequency response.

Figure 6:
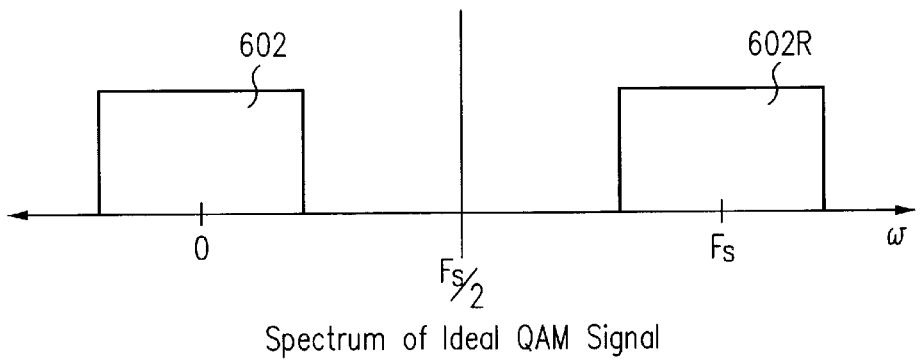
FIG. 6 illustrates the spectrum of several QAM signals and the frequency response of a band edge equalizer.
Figure 6:
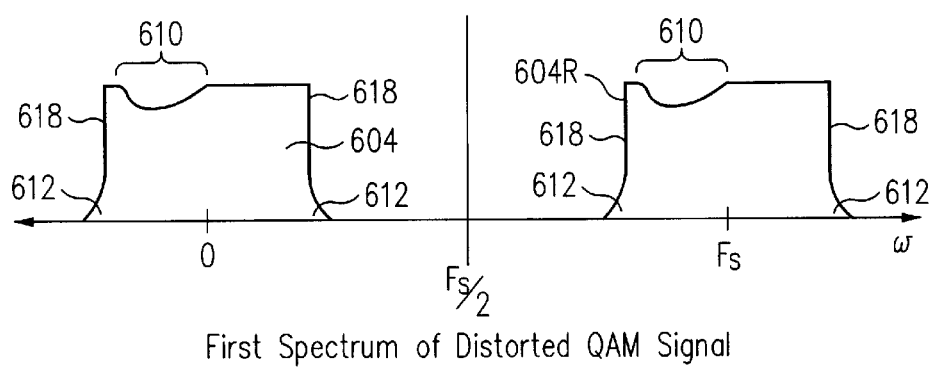
Figure 6:
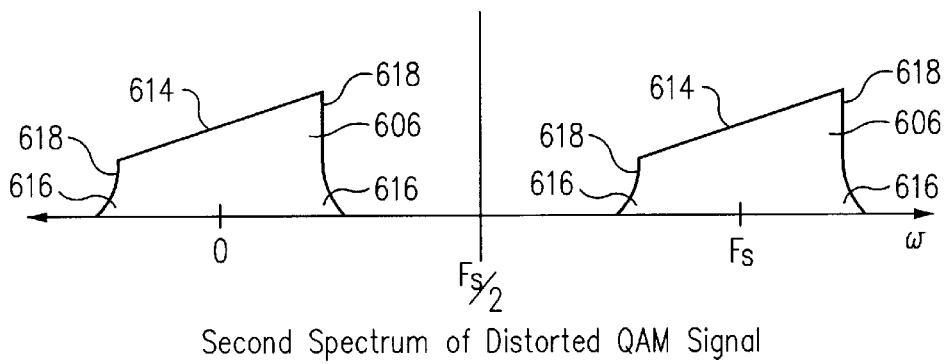
Figure 6:
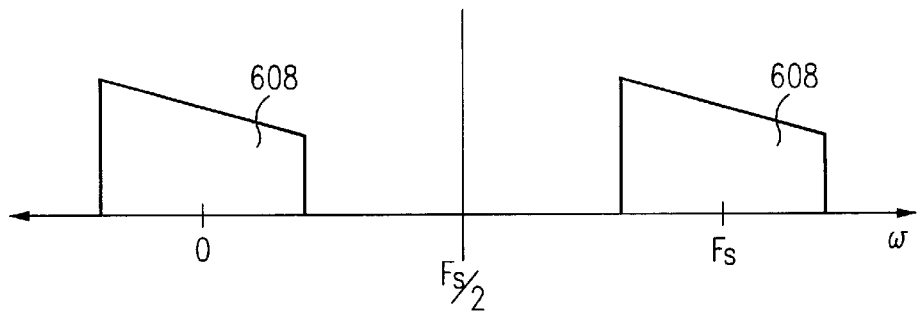

The filtering effect of the BEE 110 is described with reference to FIG. 6. In FIG. 6, spectrum 602 illustrates the base-band spectrum of an ideal QAM signal. Spectrums 604 and 606 illustrate the base-band spectrums for QAM signals that have been distorted by noise or some other form of interference. The distortions appear in these spectrums as areas 610 and 612 and the slope 614. Also shown in FIG. 6 are periodic spectral replicas, such as replicas 602R, 604R and 606R. The replicas 602R, 604R and 606R, which were created when the incoming signal r(t) was digitized, are centered about the sampling frequency Fs.

Frequency response 608 illustrates a response characteristic of the band edge equalizer 110 for a particular value of $\lambda$ determined as described with reference to FIG. 4. By passing the noisy signals 604 and/or 606 through a filter having this frequency response 608, a filtered signal will be output that has a frequency spectrum more closely approaching the ideal spectrum 602. For example, the distortions 610 and 614 and the extensions 612 and 616 of the edges of the spectrums will be reduced or substantially eliminated.

Figure 8:
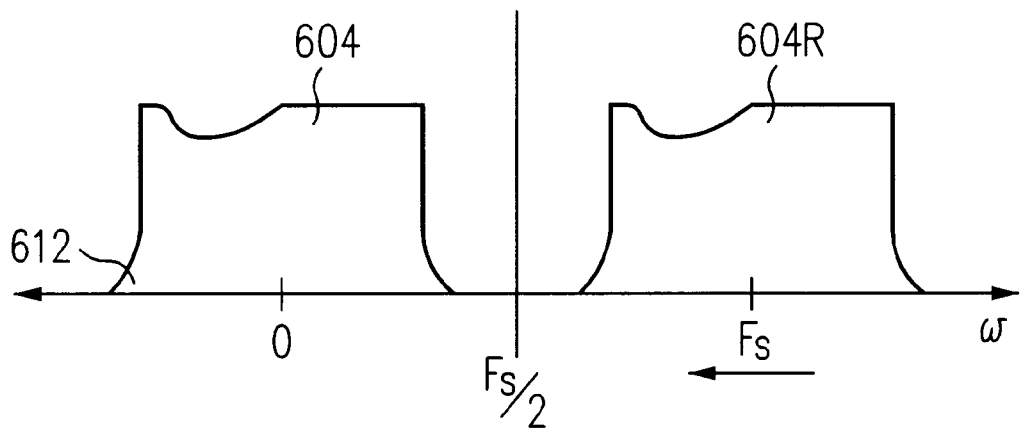
FIGS. 8 and 9 illustrate the effect of a sampling rate change on the spectrums of digital QAM signals.
Figure 8:
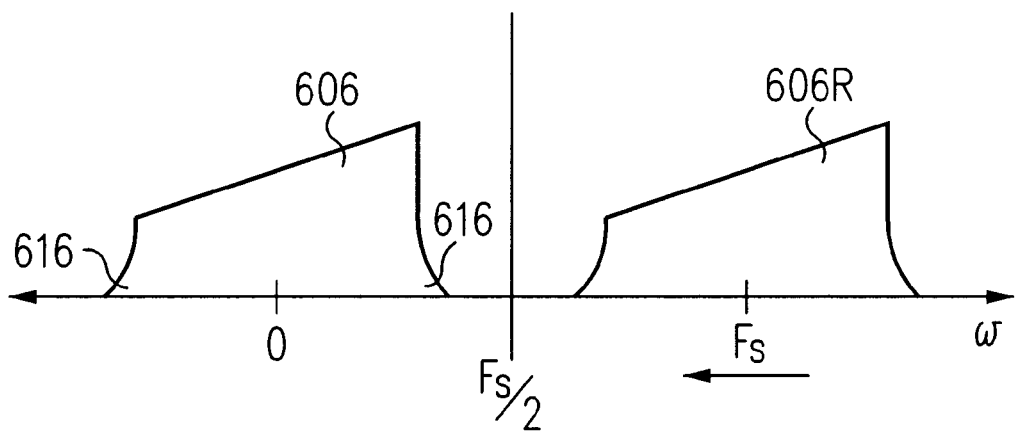
Figure 9:
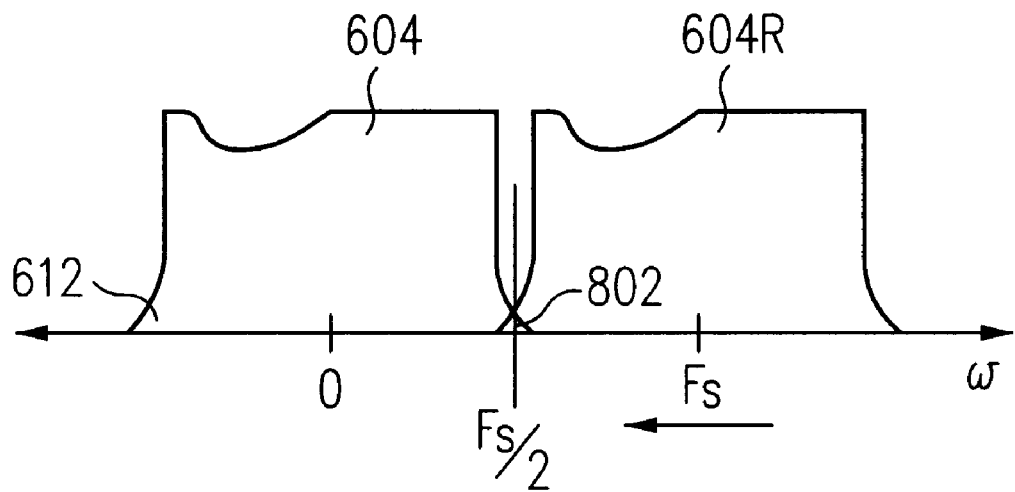
Figure 9:
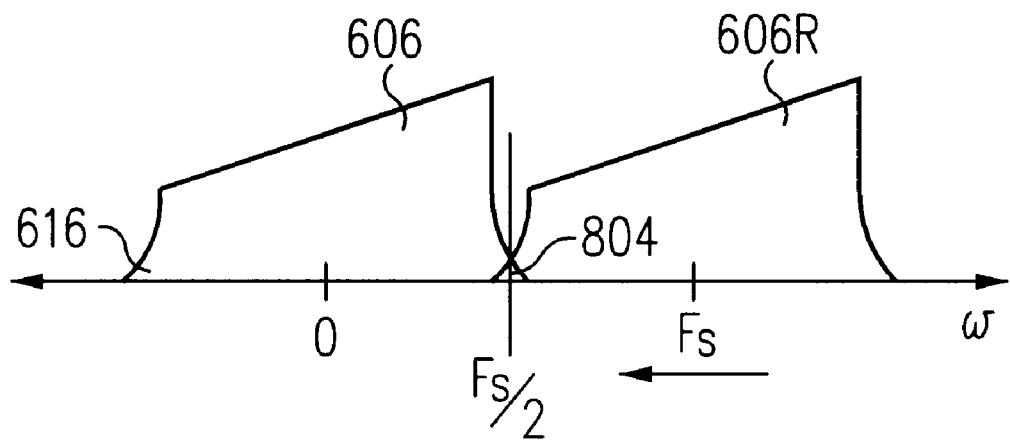

As is illustrated with reference to FIGS. 6, 8A and 8B, the sample rate of the digitized QAM signal r(k) provided to the BEE 110 can be any rate that is high enough to prevent unacceptable levels of aliasing in the signal r(k). Accordingly, in the present embodiment, the sample rate of r(c) has been reduced to two times the symbol rate Fb of the received QAM signal r(t), rather than to the symbol rate. A reduction to the symbol rate prior to band edge equalization might produce aliasing of the QAM signal due to the spectral replicas 602R, 604R and 606R, for example, produced during sampling.

As shown in FIG. 6, when the sampling rate Fs of the digitized signal r(k) (FIG. 5) is high enough, the spectral replicas 602R, 604R and 606R are separated in frequency from the respective base-bands 602, 604 and 606. Accordingly, aliasing is limited or prevented. As shown in FIG. 8A, however, reducing the sampling rate Fs of the QAM signal so that the sampling rate approaches the Nyquist frequency will cause the spectral replicas to shift toward the base-bands. As shown in FIG. 8B, reducing the sampling frequency so that it is equal to or even a sufficiently small amount greater than the Nyquist frequency can cause undesirable amounts of aliasing as shown by the overlapped areas 802 and 804 of the base-bands and their replicas. Band edge equalizing the base-band and the replica QAM bands can reduce or eliminate side distortions, such as distortions 612 and 616. These distortions are filtered out prior to reducing the sampling rate to a degree that causes unacceptable or undesirable aliasing. By filtering out these distortions using the BEE 110, the sampling rate of the band edge equalized digital QAM signal b(k) output by the BEE 110 can be reduced further than could the sampling rate of the digital signal r(k) before band edge equalization. In particular, reducing the sampling rate of the QAM signal after it has been band edge equalized will be less likely to cause unacceptable levels of aliasing. As will be discussed, the present embodiment reduces the number of multiplies per second that must be performed by the SSE 112 by reducing the sample rate of the digital QAM signal after band edge equalization.

While the present embodiment provides the BEE 110 with a signal having a symbol rate of 2Fb, alternate embodiments could provide the BEE 110 with a signal having any sampling rate that is high enough to prevent or limit unacceptable or undesirable aliasing of the non-equalized signal. The BEE 110 could also filter signals that have been sampled at higher multiples of the symbol rate (e.g. 3Fb, 4Fb, etc.) Higher sampling frequencies may add cost to the receiver, however, by requiring a more costly band edge equalizer that is able to perform a greater number of multiplies per second for example. The output of the BEE 110 is provided to the circuit 114.

As shown in FIG. 5, the circuit 114 includes a decimator 506. This decimator 506 reduces the sampling frequency Fs of the band edge equalized digital QAM signal b(k) to the symbol rate Fb. As discussed with reference to FIGS. 8A and 8B, this reduction will cause the QAM spectral replicas to shift closer to the primary QAM spectrum. Aliasing that might have been caused by the distortions 612 and 616 will be limited, reduced or eliminated because these distortions have been filtered by the BEE 110 prior to reducing the sampling frequency Fs to the symbol rate Fb. Decimator 506 can be a conventional decimator. The signal output by circuit 114 is provided to the SSE 112.

Figure 3:
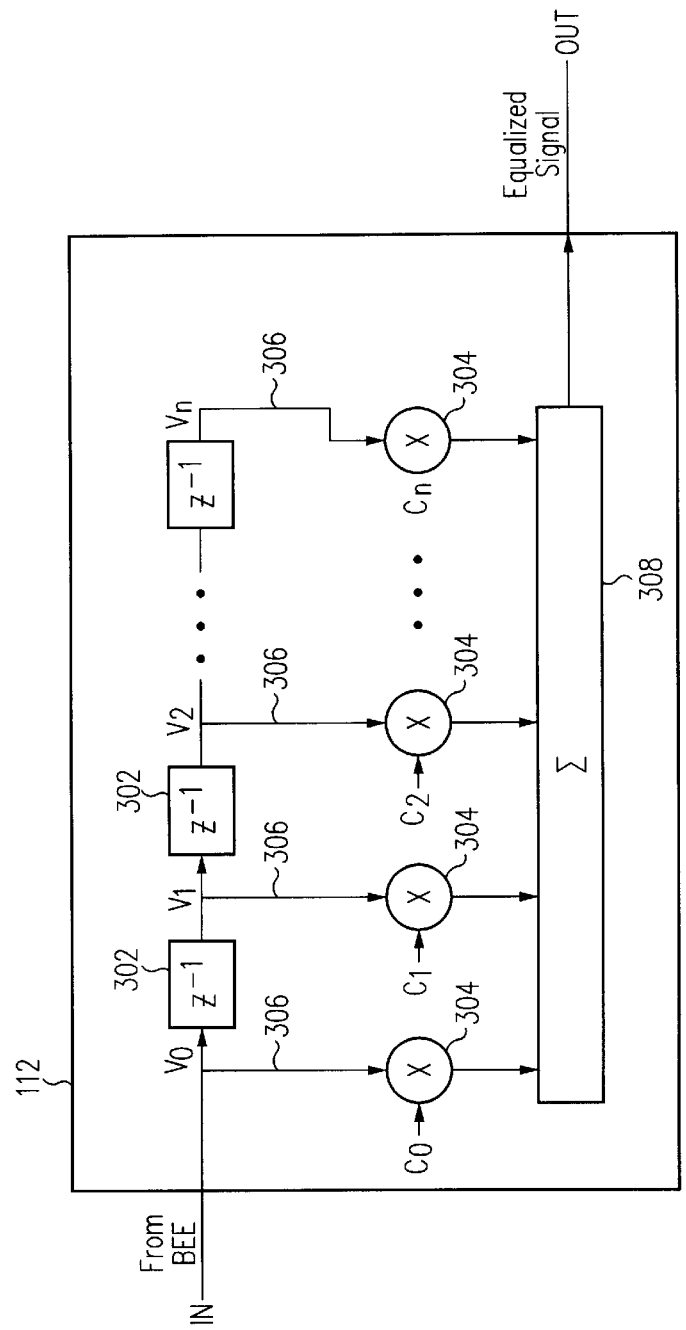
FIG. 3 illustrates a symbol spaced equalizer that can be used by an embodiment of the present invention.

FIG. 3 illustrates a symbol spaced equalizer 112 used by the present embodiment As shown, this SSE includes n delays 302 and n+1 taps 306. The taps are taken from before the first delay 302, after the last delay 302 and between each of the delays 302 to provide the symbols $v_0, v_1, v_2 \ldots v_n$. The number of taps are determined by the number of symbols across which the SSE 112 is equalizing. For example, the equalizer 112 will use four taps if it equalizes across the four symbols $v_0, v_1, v_2$ and $v_3$. Each of the taps are coupled to the adder 308. Each of the taps includes a multiplier 304 to provide appropriate weightings to each of the symbols. Accordingly, the discrete transfer function for this equalizer is $$G(z) = \sum_i c_i z^{-i} \tag{5}$$

where $c_i$ are the coefficients of the filter and $z^{-1}$ is a delay having a duration equal to the symbol period T of the signal input to the SSE 112. The number of coefficients used by the SSE 112 is determined according to the requirements of the particular application. 16 or 32 coefficients may be appropriate in the present cable context, for example.

The symbol spaced equalizer 112 of FIGS. 3 and 5 is a linear equalizer. It filters noise that has not been filtered by the band edge equalizer. It is a tapped delay FIR filter with adjustable coefficients. Thus, similar to the equalizer 110, it is adaptive. Ideally the SSE 112 adapts its filter coefficients $c_i$ to a solution that provides at its output a symbol spaced equalized QAM signal that has a minimum mean squared error. The SSE 112 initially adapts the coefficients $c_i$ in a blind equalization mode that uses blind equalizer algorithms. Once the coefficients have adapted sufficiently in the blind equalization mode, the SSE 112 switches to a decision directed equalization mode in which the coefficients are further adapted using decision directed algorithms. Such adaptation results in better equalizer performance.

With reference to FIGS. 3 and 5, the microprocessor 118 starts the blind equalization mode by resetting the SSE 112 and presetting the filter coefficients $c_i$ with nominally correct values. These nominally correct values provide an appropriate starting point for the blind equalizer algorithm that will be used. As the SSE 112 receives data during the blind equalization mode, the SSE 112 analyzes the data stream to refine the coefficients $c_i$ using the blind equalizer algorithm. When the blind equalization algorithm has reached a sufficient level of convergence, as determined using a method such as lock detection, the SSE 112 can automatically switch from the blind equalization mode to the decision directed mode. The blind equalization mode brings the adaptive SSE 112 to a minimum level of equalization performance that enables the decision directed mode to operate properly or efficiently. In particular, the decision directed mode performs better if the filter coefficients $c_i$ have adapted to a point where the decisions made during the decision directed mode are correct the majority of the time.

The present embodiment uses a blind equalizer algorithm commonly referred to as the Godard algorithm or the Constant modulus algorithm (CMA). Alternate embodiments could use the zero forcing algorithm, where one coefficient of the equalizer is fixed to unity, and the other coefficients are adapted to minimize the equalizer output power. Generally the zero forcing algorithm has a much higher probability of successful operation, but generally cannot converge to a solution that is as "good" as the Godard algorithm. For this reason, the present embodiment allows the user to provide input to set the algorithm as either the Godard algorithm or the Zero forcing algorithm or as a mixed mode, where the zero forcing algorithm is used first and is later switched to the Godard algorithm. Embodiments of the invention may also use the reduced constellation algorithm (RCA) to perform blind equalization. For a discussion of the constant modulus algorithm and the reduced constellation algorithm, please see Jablon, N., *Joint Blind Equalization, Carrier Recover, and Timing Recovery for High-Order QAM Signal Constellations, IEEE Transactions on Signal Processing*, Vol. 40, No. 6, June 1992, which publication is hereby incorporated herein by this reference. For a discussion of the Godard algorithm, please see Godard, D., *Self-recovering equalization and carrier tracking in two-dimensionial data communication systems*, IEEE Trans. Commun., vol. COM-28, no. 11, pp. 1867–1875, November 1980, which publication is hereby incorporated herein by this reference.

The SSE 112 uses the equation:

$$C_{n+1} = C_n - a\, e_n^* x_n \tag{6}$$

to refine its coefficients during both the blind equalization mode and the decision directed mode. $C_n$ represents the vector of coefficients of SSE 112 when the sample $x_n$ is being equalized, $C_{n+1}$ represents the vector of coefficients of SSE 112 that will be used to equalize the sample $x_{n+1}$, $e_n$ is an error value for the sample $x_n$ calculated according to one of the following equations (7), (8) and (9), $x_n$ is the QAM sample presently being equalized by the SSE 112, "a" is the adaptive filter gain and $e_n^*$ denotes the conjugate transpose of $e_n$. In the present embodiment, the values $C_n$, $e_n$ and $x_n$ are vectors of length 32.

The following error equations provide values for $e_n$ in equation (6):

for the CMA algorithm: $e_n = q_n[|q_n|^2 - R^2]$ (7)

for the ZF Algorithm: $e_n = q_n$ (8)

for the DD Algorithm: $e_n = [q_n - \hat{a}(n)]$ (9)

where $q_n$ is the complex value of the band edge equalized QAM signal from which the sample $x_n$ is derived, $|q_n|$ is the magnitude of $q_n$, $R^2$ is the square of ratio of the actual average amplitude value of the entire QAM constellation relative to the desired average amplitude. The variable $\hat{a}(n)$ is the estimated QAM constellation point. This point is estimated from the input complex value $q_n$. The real and imaginary components of the variable $\hat{a}(n)$ may take on the values $\{\pm 1, \pm 3, \pm 5, \ldots\}$, for example.

For the CMA mode, values of $|R|$ and $R^2$ for different QAM constellations are shown in Table 1.

TABLE 1

| N (2D constellation size) | $R^2$ | $|R|$ |
|---|---|---|
| 4-SQ | 1 | 1 |
| 16-SQ | 10 | 3.162 |
| 32-CR | 22.856 | 4.780 |
| 64-SQ | 42 | 6.481 |
| 128-CR | 110.098 | 10.493 |
| 256-SQ | 170 | 13.038 |

With reference to FIG. 5, rather than implementing the SSE 112 as shown in FIG. 3, the SSE can be implemented using a linear precursor equalizer, such as a feed forward equalizer (FFE) 538, and using a decision feedback equalizer (DFE) 540. In embodiments of the invention, FFE 538 and DFE 540 can be conventional devices. The DFE 540 can be used to further improve the signal to noise level at the decision points.

The DFE takes previous symbol decisions, weights them by multiplying by filter coefficients and subtracts the weighted signal from the waveforms input to the DFE. The DFE 540 can improve the performance of the SSE 112 because correct symbol decisions that the DFE makes will not contain noise terms. In normal operation of a DFE, the symbol error is generally less than 1 E-4 and the symbol errors do not significantly contribute to the decision noise when compared to the effect on the decision noise caused by using symbols before decisions are made as was done in the previously described decision directed algorithm, for example.

By using the band edge equalizer 110 and the symbol spaced equalizer 112, the overall cost of the receiver 106 or 106' can be reduced without sacrificing substantial performance. In particular, the BEE/SSE combination may be used to equalize the QAM signal rather than using a fractional spaced equalizer (FSE), for example. Fractional spaced equalizers may be more expensive and more complex than the BEE/SSE combination. An FSE typically will require more taps and more delays than an SSE to equalize over the same number of symbols.

Figure 7:
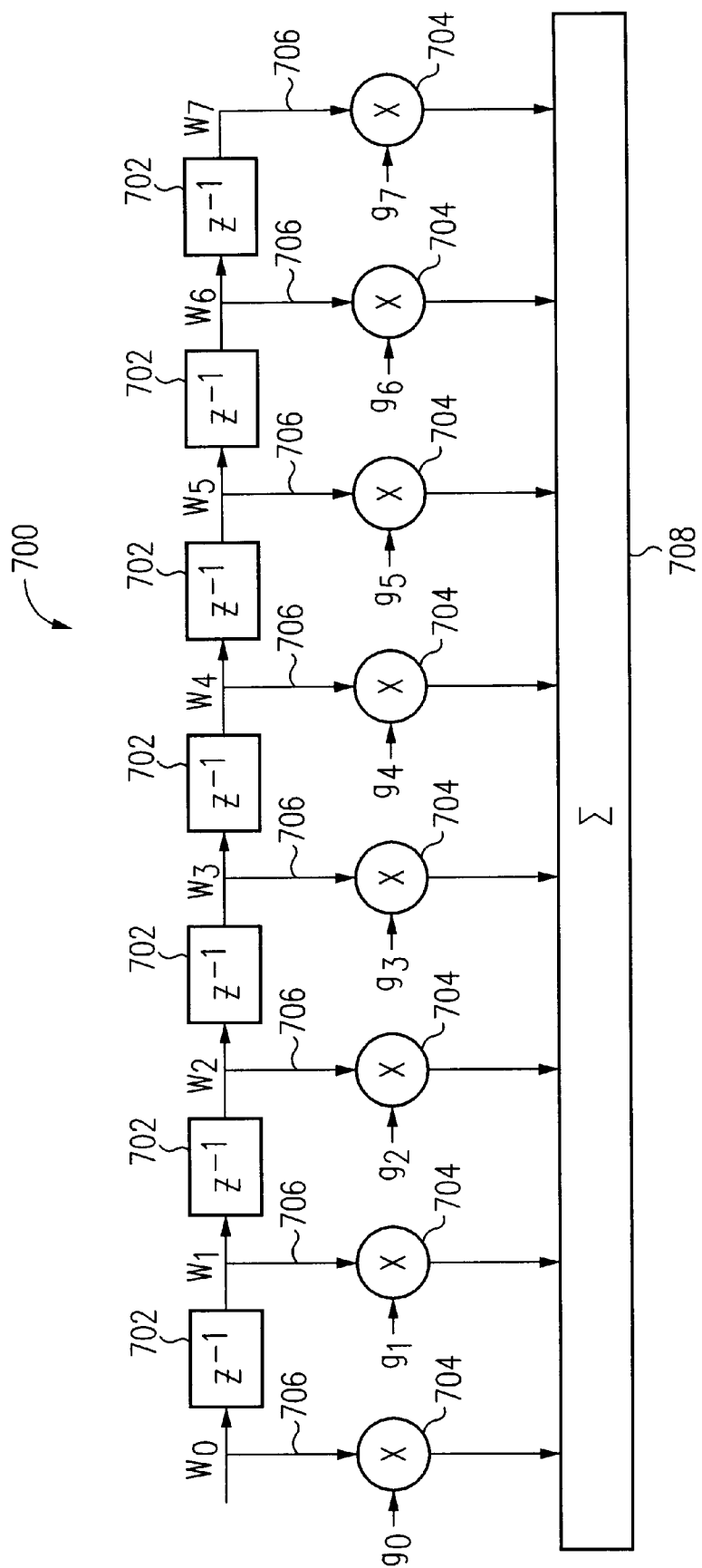
FIG. 7 illustrates a conventional fractional spaced equalizer.

For example, assume it is desired that the received QAM signal be equalized over four symbols. Referring to FIG. 3, it was described that the symbol spaced equalizer 112 would need only four taps and three delays to equalize the signal. This SSE 112 can be contrasted to the FSE 700 of FIG. 7. FSE 700 includes delays 702 and taps 706. The taps 706 each include a multiplier 704 that multiplies by an appropriate weighting coefficient $g_i$. The taps 706 are each coupled to the adder 708. The delays 702 $z^{-1}$ of FIG. 7 have a duration of T/2 where T is the period of a single symbol at the symbol frequency. Because the delays 702 are only one half of a symbol period, the FSE 700 requires eight taps 706 and seven delays 702 to equalize across four symbols. Thus, when equalizing across a particular number of symbols at a particular frequency, the SSE 112 will need to perform only one half as many multiplies per second as the FSE 700. In other words, using the BEE/SSE combination reduces the required number of multiplies per second by a factor of two due to the fewer number of taps being used.

Embodiments of the invention divide equalization into stages in a manner that enables portions of the equalization to be performed by each stage and enables the overall cost of the components to be reduced. As discussed, using the BEE 110 and the SSE 112 enables the present embodiment to provide the QAM signal to the SSE 112 at a sampling frequency equal to the symbol rate rather than equal to two times the symbol rate, for example. A signal provided to the FSE 700, however, may need to be provided at a sampling frequency that is two times the symbol rate to avoid the aliasing discussed above. Because the FSE receives a signal that has a higher sample rate (to avoid the aliasing), it will need to perform a greater number of multiplies per second. Using the frequencies used by the embodiment described herein, the BEE/SSE combination achieves another factor of 2 reduction in the number of multiplies per second to be achieved due to the lower sampling frequency of the signal input to the SSE 112. Accordingly, the BEE/SSE combination overall can reduce the number of multiplies per second by a factor of four (i.e. half as many taps and half the sample rate) over what is required by a conventional FSE.

The present embodiment is general enough so that parameters may be loaded via an adjunct processor to accommodate a reasonable range of carrier and symbol frequencies, baud rates and constellations, given that the underlying modulation format is QAM and reasonable efficiency results. The present embodiment is general enough so that it can be modified to accommodate other requirements as they evolve from a market and technical standpoint While Applicant has described the invention in terms of specific embodiments, the invention is not limited to or by the disclosed embodiments. The Applicant's invention may be applied beyond the particular systems mentioned as examples in this specification. The Applicants invention includes any aspects that are supported by this specification.

What is claimed is:

1. A method for equalizing a digital quadrature amplitude modulated (QAM) signal, the method comprising the steps of:

receiving the digital QAM signal at an input of a band edge equalizer;

band edge equalizing the digital QAM signal using the band edge equalizer, outputting from the band edge equalizer a band edge equalized digital QAM signal;

receiving the band edge equalized digital QAM signal at an input of a symbol spaced equalizer;

symbol space equalizing the band edge equalized digital QAM signal using the symbol spaced equalizer to provide a symbol spaced equalized digital QAM signal.

2. The method of claim 1, wherein the step of band edge equalizing the digital QAM signal comprises the step of:

adapting filter coefficients of the band edge equalizer in response to a measure of noise where the measure of noise is obtained using the digital QAM signal.

3. The method of claim 2, wherein the step of adapting the filter coefficients of the band edge equalizer comprises the steps of:

providing as the measure of noise a measure of spectral energy in an upper and a lower band edge of a base-band spectrum where the base-band spectrum is obtained using the digital QAM signal; and adapting the filter coefficients of the band edge equalizer in response to the measure of spectral energy.

4. The method of claim 3, wherein the base-band spectrum is the base-band spectrum of the band edge equalized digital QAM signal output by the band edge equalizer.

5. The method of claim 2, wherein the step of adapting the filter coefficients of the band edge equalizer comprises the steps of:

providing an adaption coefficient; and adapting the filter coefficients of the band edge equalizer in response to this adaption coefficient.

6. The method of claim 1, wherein the step of symbol space equalizing the band edge equalized digital QAM signal comprises the step of:

adapting filter coefficients of the symbol spaced equalizer in response to a measure of noise where the measure of noise is obtained using the digital QAM signal.

7. The method of claim 6, wherein the measure of noise is obtained from the symbol spaced equalized digital QAM signal output by the symbol spaced equalizer.

8. The method of claim 6, wherein the step of adapting the filter coefficients of the symbol spaced equalizer comprises the steps of:

adapting the filter coefficients of the symbol spaced equalizer in a blind equalization mode; and adapting the filter coefficients of the symbol spaced equalizer in a decision directed mode wherein the decision directed mode occurs after the blind equalization mode.

9. The method of claim 8, wherein the step of adapting the filter coefficients of the symbol spaced equalizer in a blind equalization mode comprises the step of:

executing a constant modulus algorithm.

10. The method of claim 8, wherein the step of adapting the filter coefficients of the symbol spaced equalizer in a blind equalization mode comprises the step of:

executing a zero forcing algorithm.

11. The method of claim 8, wherein the step of adapting the filter coefficients of the symbol spaced equalizer in a blind equalization mode comprises the step of:

executing a constant modulus algorithm and a zero forcing algorithm.

12. The method of claim 8, wherein the step of adapting the filter coefficients of the symbol spaced equalizer in a decision directed equalization mode comprises the step of:

providing an estimate of an error between a received QAM symbol being equalized and a corresponding transmitted symbol $x_n$;

estimating $x_n$ using a least mean square of a probability density function of the digital QAM signal.

13. The method of claim 1, wherein the step of symbol space equalizing the band edge equalized digital QAM signal using the symbol spaced equalizer comprises the steps of:

equalizing the band edge equalized digital QAM signal using a linear pre-cursor equalizer to produce an interim equalized QAM signal; and equalizing the interim equalized QAM signal using a decision feedback equalizer to provide the symbol spaced equalized digital QAM signal.

14. The method of claim 13, wherein the linear pre-cursor equalizer comprises a feed forward equalizer.

15. The method of claim 1, further comprising the step of:

demodulating the digital QAM signal prior to band edge equalizing the digital QAM signal such that the digital QAM signal received by the band edge equalizer is a demodulated digital QAM signal.

16. The method of claim 1, further comprising the step of:

demodulating the digital QAM signal after band edge equalizing the digital QAM signal.

17. The method of claim 1, further comprising the step of:

interpolating the digital QAM signal prior to band edge equalizing the digital QAM signal to produce an interpolated digital QAM signal such that the digital QAM signal received by the band edge equalizer is obtained from the interpolated digital QAM signal.

18. The method of claim 17, further comprising the step of:

resampling the interpolated digital QAM signal prior to band edge equalizing the digital QAM signal to produce a resampled digital QAM signal such that the digital QAM signal received by the band edge equalizer is obtained from the resampled digital QAM signal.

19. The method of claim 18, wherein the interpolated digital QAM signal is resampled at a multiple of the symbol rate.

20. The method of claim 19, wherein the interpolated digital QAM signal is resampled at two times the symbol rate.

21. The method of claim 1, further comprising the step of:

interpolating the digital QAM signal after band edge equalizing the digital QAM signal to produce an interpolated digital QAM signal.

22. The method of claim 21, further comprising the step of:

resampling the interpolated digital QAM signal to produce a resampled digital QAM signal.

23. The method of claim 1, further comprising the step of:

match filtering the digital QAM signal prior to band edge equalizing the digital QAM signal to produce a match filtered digital QAM signal such that the digital QAM signal received by the band edge equalizer is obtained from the match filtered digital QAM signal.

24. The method of claim 1, further comprising the step of:

match filtering the digital QAM signal after band edge equalizing the digital QAM signal to produce a match filtered digital QAM signal.

25. The method of claim 1 further comprising the step of:

decimating a sampling frequency of the band edge equalized digital QAM signal prior to receiving the band edge equalized digital QAM signal at the input of the symbol space equalizer.

26. The method of claim 25, wherein the sampling frequency of the band edge equalized digital QAM signal is decimated to a multiple of the symbol rate.

27. The method of claim 1, wherein the digital QAM signal that is received by the band edge equalizer has a sampling frequency that limits aliasing in the digital QAM signal prior to band edge equalization.

28. The method of claim 27, wherein the sampling frequency is a multiple of a symbol rate of the digital QAM signal.

29. The method of claim 28, wherein the sampling frequency is two times the symbol rate.

30. The method of claim 27, further comprising the step of:

reducing a sampling frequency of the band edge equalized digital QAM signal prior to the step of symbol space equalizing the band edge equalized digital QAM signal.

31. The method of claim 30, wherein the sampling frequency of the digital QAM signal is about two times a symbol rate of the digital QAM signal and the sampling frequency of the band edge equalized digital QAM signal is reduced to the symbol rate.

* * * * *